April 21, 1925.

J. MURSCH 1,534,072

OVEN FOR COOKING STOVES

Filed June 26, 1924

Inventor
John Mursch
By Martin & Rendell
Attorney

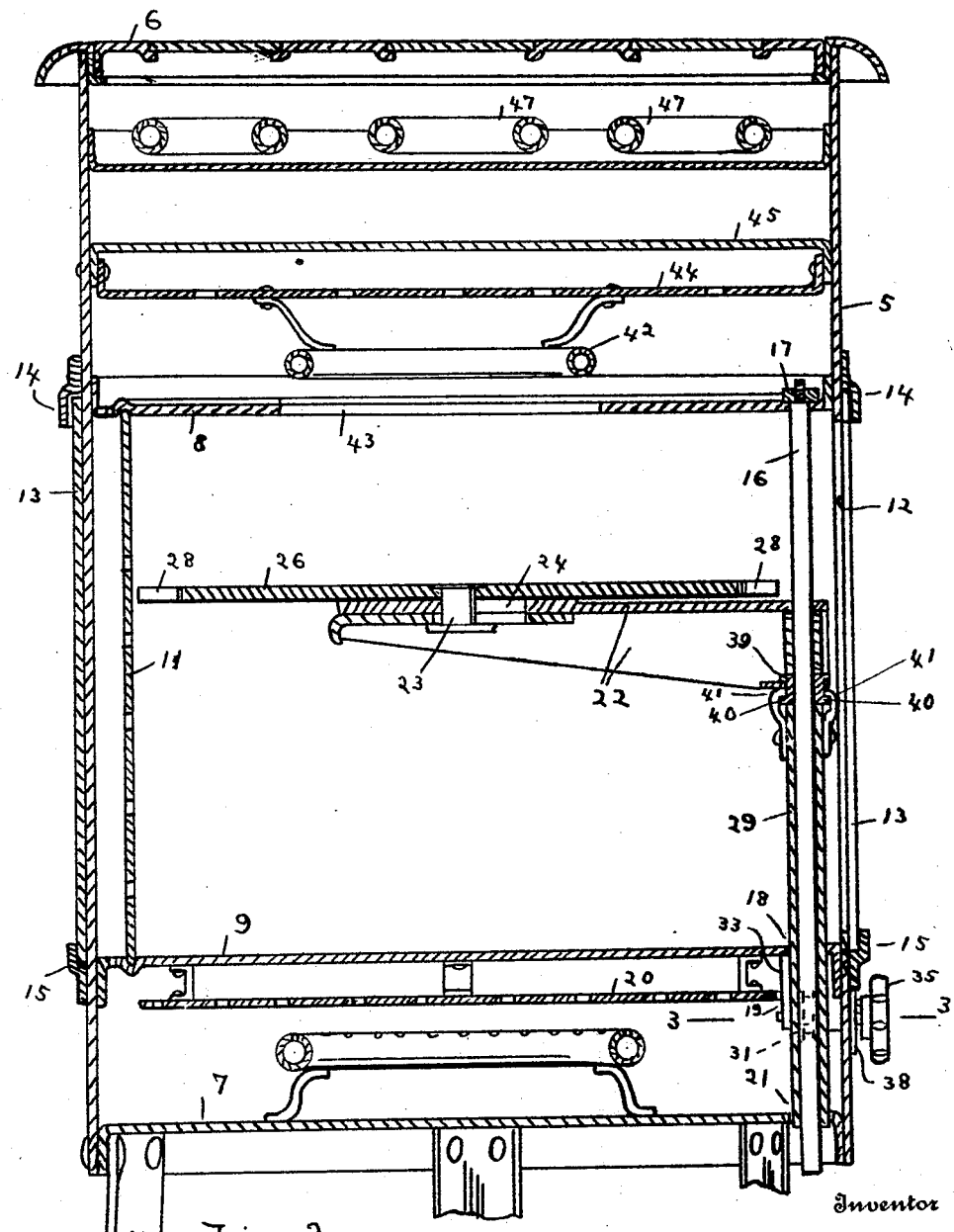

Patented Apr. 21, 1925.

1,534,072

UNITED STATES PATENT OFFICE.

JOHN MURSCH, OF UTICA, NEW YORK.

OVEN FOR COOKING STOVES.

Application filed June 26, 1924. Serial No. 722,601.

*To all whom it may concern:*

Be it known that I, JOHN MURSCH, a citizen of the United States, and a resident of Utica, in the county of Oneida and State of New York, have invented certain new and useful Improvements in Ovens for Cooking Stoves; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to ovens for cooking stoves.

The purpose of my invention is to provide a new and improved form of oven and particularly a construction which can be readily and economically formed from sheet iron parts stamped or rolled to proper shape and readily fitted together.

A further purpose is to provide an oven for a cooking stove provided with a shelf which can be rotated within the oven, withdrawn substantially from the oven and where the shelf also can be vertically adjusted relative to the oven.

A further purpose is to provide various combinations of the features already mentioned and to provide parts and constructions that will render said features readily constructed, durable in use and convenient in operation.

A still further object is to provide an oven shelf having the various movements above mentioned with the shelf and co-operating parts of such construction and arrangement that the whole capacity of the oven both above and below the shelf is fully usable, that is unobstructed by any of the mechanisms used to support or move the shelf.

A still further object is to provide especially convenient means for raising or lowering and swinging and rotating the shelf and to have the means for raising or lowering the shelf operated from without the oven.

Further purposes and advantages of my invention will appear from the specification and claims herein.

Fig. 2 is a vertical sectional view on line 2—2 of Fig. 1.

Figure 1:
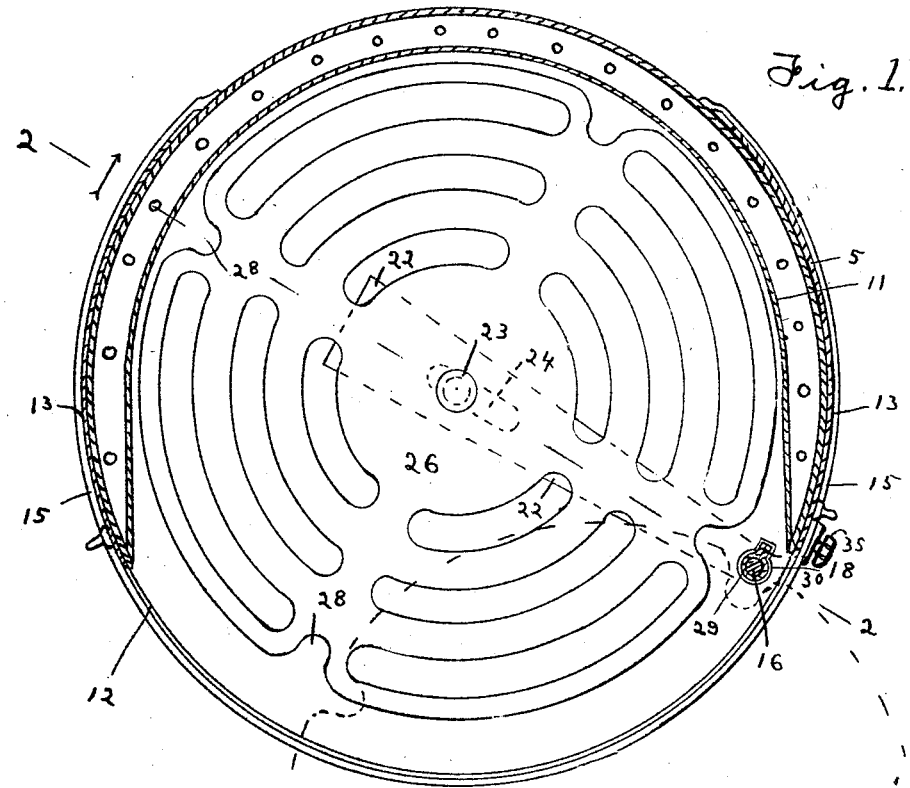
Fig. 1 is a horizontal sectional view through an oven embodying my invention and showing in dotted lines the oven shelf partly withdrawn from the oven.

While I have illustrated my invention in connection with a gas stove having an oven heated by a gas burner it will be noted that my invention is not limited to gas stoves or gas heated ovens.

Referring to the drawings in a more particular description it will be seen that the stove has a main casing 5 of cylindrical form with a top 6, bottom 7 and intermediate partitions namely the oven top 8 and the oven bottom 9 all conveniently formed as flanged disks readily mounted within the cylindrical casing 5. The stove is provided with suitable legs 10 secured to the bottom of the main casing.

Between the oven top 8 and the oven bottom 9 there is provided an inner casing 11 cylindrical in form and spaced evenly from the main casing 5 for the rear half of the oven, but the forward ends of this casing in front extend directly forward with parallel walls so as to meet and be joined to the outer casing at the side edges of the oven door aperture 12 as plainly indicated in Fig. 1. It will thus be seen that the inner casing is spaced a slight distance away from the main casing throughout the side walls of the oven in order to get the proper heat insulation, and to provide a passageway for the heat to enter the sides of the oven.

The outer or main casing 5 is cut away entirely from the front of the oven to form the oven door aperture 12 extending approximately from the oven top 8 to the oven bottom 9.

This main oven aperture 12 is closed by a pair of oven doors 13—13 arc-shaped in horizontal cross section to fit the circle of the outer surface of the main casing 5 with said doors slidingly mounted immediately outside said outer casing and held in place and supported by top and bottom flanged slideways 14 and 15. This arrangement of sliding doors permits access to the oven with a slight movement of one or both doors either at the center of the door or at either side of the door and permits the oven to be entirely opened by sliding the doors in opposite directions from the center. The sliding door construction adapts the stove to be used in a very small space or close to the side or corner of a room by reason of the fact that when the doors are opened they do not take up any additional room nor project outward from the stove.

Vertically arranged within the oven just to one side of the door there is provided a strong rod 16 suitably suspended from the oven top 8 as by means of a nut 17 engaging the reduced and threaded upper extremity of the rod. The rod extends downwardly entirely through the oven and through an aperture 18 in the oven bottom 9, through an aperture 19 in the baffle plate 20 below the oven bottom and also through an aperture 21 in the stove bottom 7.

Swingingly and revolubly mounted upon this rod 16 there is provided the bracket 22 which is long enough to have its free end extend past the center of the oven. Through a slot 24 near the outer end of said bracket projects stud 23 fastened to the center of the shelf 26 with the lower headed end of the stud projecting through the elongated slot 24 in the bracket. The oven shelf 26 is preferably of circular formation so that when it is in normal housed position in the oven it substantially fills the oven. In the periphery of the oven shelf 26 there are provided several spaced recesses 28. When the oven shelf is in normal housed condition as shown in full lines in Fig. 1 the shelf may be freely rotated in order to place the food where desired in the oven and to bring any articles upon the oven shelf to the front of the oven for ready inspection. When it is desired to swing the oven shelf forwardly out of the oven to a position about as shown in dotted lines in Fig. 1, the oven shelf is rotated so as to bring any one of the recesses 28 opposite the rod 16. Thereupon the shelf 26 may be readily so withdrawn by reason of the fact that the oven shelf may now slide towards the rod 16 enough to have the left hand edge of the oven shelf as the parts are seen in Fig. 1 slide past that side of the oven aperture.

This sliding of the shelf on the bracket is necessary when the shelf is, as shown in the drawings, of substantially the same diameter as the diameter of the oven. The sliding may be done by direct manipulation of the shelf by hand as the shelf is drawn forward or the shelf may be simply drawn forward and automatically slid on the bracket by the camming engagement of the edge of the shelf against the left side of the oven. As the oven shelf is moved back into the oven it will be slid lengthwise on the bracket away from the rod either by manual direction of the hand or automatically moved by its opposite edge engaging the right hand side of the oven.

Figure 3:
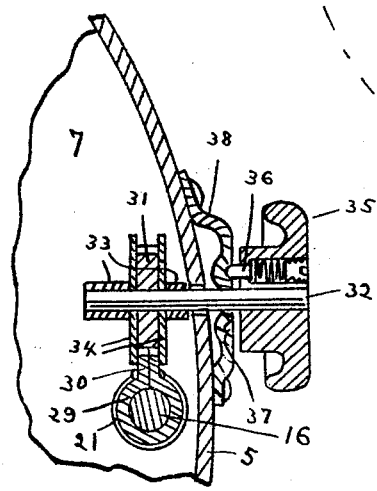
Fig. 3 is a horizontal sectional view on an enlarged scale of the shelf-raising mechanism on line 3—3 of Fig. 2.

As part of the means for raising and lowering the shelf there is slidingly mounted on the rod 16 below the bracket 22 a long sleeve 29 having an outwardly and longitudinally extending wing having teeth to form a rack 30 to be engaged and moved by a pinion 31 securely fastened to a shaft 32. This shaft and pinion are located beneath the bottom 9 of the oven and the shaft may be conveniently supported and held from longitudinal movement by means of a slotted hanger 33 depending from said oven bottom 9 with the lower part of said hanger straddling the pinion 31 as indicated in Fig. 3.

The sleeve is kept from rotation and the rack in engagement with the pinion 31 by enlarged disks 34 on opposite sides of the pinion straddling the rack 30 and also by the aperture 18 in the oven bottom 9, the aperture 19 in baffle plate 20 and the aperture 21 in the stove bottom being of key-hole form having their elongation fitting the rack.

The shaft 32 projects beyond the outer casing 5 a short distance and there has fastened thereto a hand wheel 35. In the hub of the hand wheel is provided an inwardly extending spring pressed plunger 36 the inner end of which is adapted to yieldingly engage recesses 37 provided in a boss 38 secured to the casing around the shaft 32. This spring catch mechanism is sufficiently strong to hold the rack from being forced downward by the weight of the bracket and the shelf and shelf contents but admits of rotation of the wheel and thereby movement of the shelf when the wheel is directly rotated by hand.

In order to positively draw down the shelf against any binding action of the shelf on the rod 16, there is attached to the bottom of the bracket a bushing 39 surrounding the rod 16 and having at its lower end an outwardly extending annular flange 40 against the top of which engage the inturned upper ends of two fingers 41 fastened to the sleeve 29.

It will thus be seen that the shelf may be moved up or down within a considerable range by rotation of the hand wheel and left securely held in desired position and that this vertical movement does not interfere with, and is not interfered with in any way by the swinging motion of the bracket and shelf on the rod.

By raising the shelf well towards the top of the oven said shelf may be used as a broiling shelf receiving heat from the burner 42 suspended just above the main opening 43 of the oven top 8. This burner may be suspended from a cross perforated partition 44 which in turn is spaced a short distance down from the imperforate partition 45 which collects the gases and odors from the oven and directs them to the usual vent. Above this imperforate partition 45 are located and suitably supported the usual burners 47 below the stove top 6.

What I claim as new and desire to secure by Letters Patent is:

1. In a stove the combination of a chamber forming an oven having a door at its front side, a bracket swingingly mounted in the oven adjacent one side of the door and adapted to swing theretowards and a shelf revolubly mounted on the free end of said bracket and means operative from without the oven for vertically moving said bracket.

2. In a stove the combination of a chamber forming an oven having a door at its front side, a bracket swingingly mounted in the oven adjacent one side of the door and adapted to swing theretowards and a shelf revolubly mounted on the free end of said bracket, means for vertically moving said bracket and means for locking said bracket in position.

3. In a stove the combination of a chamber forming an oven having a door in the side thereof, a vertically arranged rod in said oven adjacent one side edge of the door, a bracket slidingly mounted on said rod, a shelf supported on said bracket, means operated from without the oven for moving said bracket vertically on said rod.

4. In a stove the combination of a chamber forming an oven having a door in the side thereof, a vertically arranged rod in said oven adjacent one side edge of the door, a bracket slidingly mounted on said rod, a shelf supported on said bracket, means including a rack and pinion operated from without the oven for moving said bracket vertically on said rod.

5. In a stove the combination of a chamber forming an oven having a door in the side thereof, a vertically arranged rod in said oven adjacent one side edge of the door, a bracket slidingly and swingingly mounted on said rod, a shelf supported on said bracket, means operated from without the oven for moving said bracket vertically on said rod.

6. In a stove the combination of a circular chamber forming an oven having a door in the side thereof, a vertically arranged rod in said oven adjacent one side edge of the door, a bracket slidingly mounted on said rod, a shelf revolubly supported on said bracket, means operated from without the oven for moving said bracket vertically on said rod.

In witness whereof I have affixed my signature, this 14th day of June 1924.

JOHN MURSCH.